(12) United States Patent
Edman et al.

(10) Patent No.: US 9,849,515 B2
(45) Date of Patent: Dec. 26, 2017

(54) METHOD OF MANUFACTURING A CUTTING TOOL AND A CUTTING TOOL

(71) Applicant: SANDVIK INTELLECTUAL PROPERTY AB, Sandviken (SE)

(72) Inventors: Jonny Edman, Jarna (SE); Nima Zarif Yussefian, Vällingby (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 173 days.

(21) Appl. No.: 14/724,841

(22) Filed: May 29, 2015

(65) Prior Publication Data

US 2016/0016232 A1    Jan. 21, 2016

(30) Foreign Application Priority Data

Jun. 3, 2014   (EP) ..................................... 14170923

(51) Int. Cl.
| | | |
|---|---|---|
| *B23B 27/14* | (2006.01) | |
| *B23P 15/34* | (2006.01) | |
| *B23P 15/32* | (2006.01) | |
| *B24B 3/34* | (2006.01) | |

(52) U.S. Cl.
CPC ............ *B23B 27/145* (2013.01); *B23P 15/32* (2013.01); *B23P 15/34* (2013.01); *B24B 3/343* (2013.01); *B23B 2200/0447* (2013.01); *B23B 2200/0452* (2013.01); *B23B 2200/202* (2013.01); *B23B 2200/245* (2013.01); *B23B 2200/28* (2013.01); *B23B 2222/28* (2013.01); *B23B 2222/80* (2013.01); *B23B 2222/88* (2013.01); *B23B 2224/28* (2013.01); *B23B 2226/125* (2013.01)

(58) Field of Classification Search
CPC .......... B23B 27/145; B23B 2200/0452; B26B 2200/202; B26B 2226/125; B26B 2222/28; B23P 15/32; B23P 15/34
See application file for complete search history.

(56) References Cited

U.S. PATENT DOCUMENTS

| | | | |
|---|---|---|---|
| 2,502,922 A | | 4/1950 | Bura |
| 4,411,564 A | * | 10/1983 | Johnson ................... B23C 5/109 407/113 |
| 4,616,962 A | * | 10/1986 | Ushijima ................. B23C 5/202 407/113 |
| 4,940,369 A | * | 7/1990 | Aebi ........................ B23C 5/109 407/113 |
| 4,966,501 A | * | 10/1990 | Nomura ................. B23B 27/148 407/119 |
| 5,190,418 A | | 3/1993 | Nakayama et al. |

(Continued)

FOREIGN PATENT DOCUMENTS

| | | |
|---|---|---|
| EP | 2 952 277 A1 * | 12/2015 |
| JP | S61159315 A | 7/1986 |

*Primary Examiner* — Hwei C Payer
(74) *Attorney, Agent, or Firm* — Corinne R. Gorski

(57) ABSTRACT

The disclosure relates to a method of manufacturing a cutting tool including the steps of: providing a cutting tool blank including a cutting edge, defined by a cross-sectional wedge angle ($\beta$). The wedge angle has a variation along the cutting edge, and material is removed from the cutting edge with a constant material removal rate per length unit of the edge, such as to form a corresponding variation of edge rounding along the cutting edge. The disclosure further relates to a cutting tool including the cutting edge defined by the cross-sectional wedge angle having a variation along the cutting edge and wherein the cutting edge has a corresponding variation of edge rounding along the cutting edge.

15 Claims, 6 Drawing Sheets

(56) References Cited

U.S. PATENT DOCUMENTS

| | | | | |
|---|---|---|---|---|
| 5,365,805 A * | 11/1994 | Pantzar | ................... | B23C 5/202 |
| | | | | 407/114 |
| 5,431,072 A * | 7/1995 | Christoffel | .............. | B23P 15/30 |
| | | | | 407/119 |
| 5,442,979 A | 8/1995 | Hsu | | |
| 5,447,396 A | 9/1995 | Pantzar et al. | | |
| 5,477,754 A * | 12/1995 | Herbon | ................ | B23B 27/141 |
| | | | | 407/113 |
| 5,486,073 A * | 1/1996 | Satran | ..................... | B23C 5/109 |
| | | | | 407/113 |
| 5,771,763 A | 6/1998 | Naslund et al. | | |
| 6,053,673 A * | 4/2000 | Swift | ...................... | B23B 51/10 |
| | | | | 407/42 |
| 6,612,786 B1 | 9/2003 | Kanada et al. | | |
| 6,722,824 B2 * | 4/2004 | Satran | ................... | B23C 5/2221 |
| | | | | 407/113 |
| 7,837,417 B2 * | 11/2010 | Blomstedt | ............ | B23B 27/145 |
| | | | | 407/113 |
| 8,371,774 B2 * | 2/2013 | Zastrozynski | ........ | B23B 27/141 |
| | | | | 407/113 |
| 9,238,285 B2 * | 1/2016 | Endtbacka | ............ | B23B 27/141 |
| 2002/0127068 A1 | 9/2002 | Kinukawa et al. | | |
| 2011/0020081 A1 * | 1/2011 | Webb | ....................... | B22F 7/06 |
| | | | | 407/115 |
| 2013/0315682 A1 | 11/2013 | Wahlsten et al. | | |
| 2015/0093207 A1 * | 4/2015 | Lawes | ................. | B23B 51/0466 |
| | | | | 408/229 |
| 2016/0016232 A1 * | 1/2016 | Edman | ................. | B23B 27/145 |
| | | | | 29/557 |

* cited by examiner

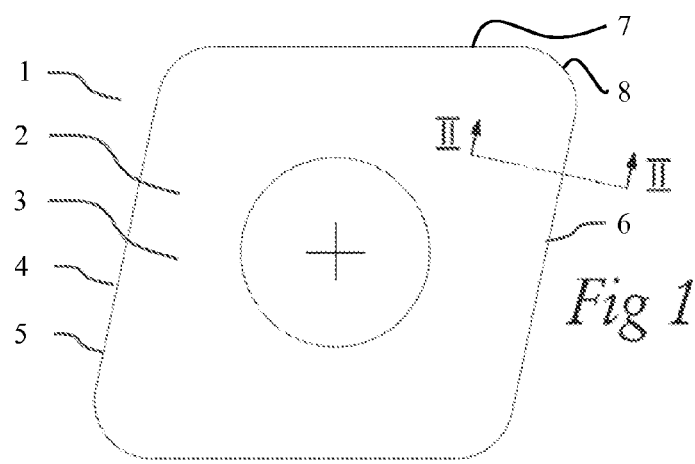
Fig 1
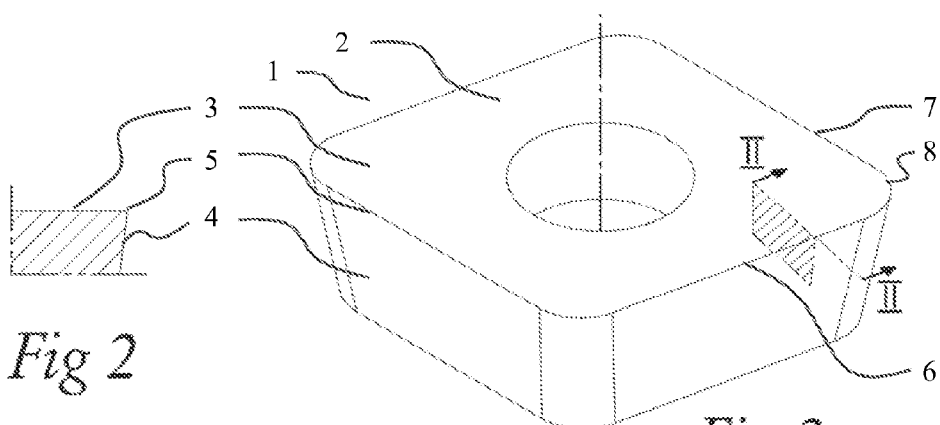
Fig 2
Fig 3
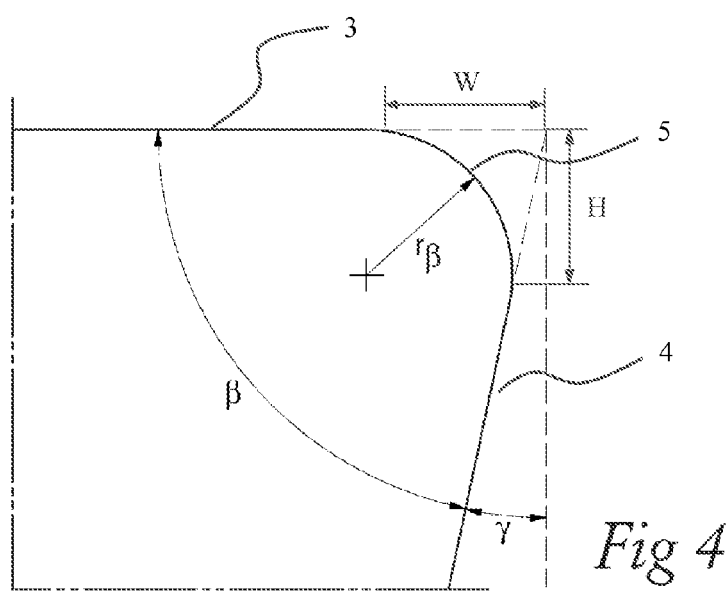
Fig 4

METHOD OF MANUFACTURING A CUTTING TOOL AND A CUTTING TOOL

RELATED APPLICATION DATA

This application claims priority under 35 U.S.C. §119 to EP Patent Application No. 14170923.8, filed on Jun. 3, 2014, which the entirety thereof is incorporated herein by reference.

TECHNICAL FIELD

The disclosure relates to a method of manufacturing a cutting tool and to a cutting tool having a cutting edge having a variation of edge rounding along the cutting edge of the cutting tool.

BACKGROUND

Cutting tools are used in machining of materials, preferably metallic materials, in various types of machining operations, e.g. turning, drilling and milling operations. During machining, different portions of the cutting edge of a cutting tool may be subjected to very different machining conditions, e.g. related to cutting speed, uncut chip thickness etc.

Therefore it may be desirable to optimize different portions of the cutting edge for different machining conditions in order to optimize the cutting performance for the cutting tool. It may be desirable to provide a stronger edge at portions of the cutting edge where the cutting speed is lower or the uncut chip thickness is larger and a sharper edge where the cutting speed is higher or the uncut chip thickness is smaller.

In view of this, EP 2484467 A1 discloses a cutting insert having a cutting edge with a first radius at a first point of the cutting edge, and a different second radius at second point along the cutting edge. It is disclosed that the edge radii may be formed by a brushing operation.

To form the cutting edge disclosed in EP 2484467 A1 having the different first and second radii at different portions along the cutting edge by means of brushing, different degrees of brushing at the different portions are needed, implying a complex manufacturing procedure.

Thus it is desirable to provide an improved method of manufacturing a cutting tool to provide a variation of edge rounding along the cutting edge, and to provide a cutting tool which enables a simplified manufacturing in order to obtain a variation of edge rounding along the cutting edge.

SUMMARY

An aspect of the present disclosure is to provide a cutting tool and a method of manufacturing a cutting tool where a variation of the edge rounding along the cutting edge may be achieved by simple, fast and reliable processing means.

Thus the disclosure relates to a method of manufacturing a cutting tool, comprising the steps of:
providing a cutting tool blank including a cutting edge. The cutting edge is defined by a cross-sectional wedge angle, which has a variation along the cutting edge. The method further comprises removing material from the cutting edge, with a constant material removal rate per length unit of the edge, such as to form a corresponding variation of edge rounding along the cutting edge.

Thereby the method provides a simple, fast and reliable way of achieving a cutting tool having a variation of the edge rounding along the cutting edge. By removing material from the cutting edge with a constant material removal rate per length unit of the edge, the variation of wedge angle along the edge will provide a variation of edge rounding along the cutting edge. The obtained variation of edge rounding along the cutting edge thus corresponds to the variation of the wedge angle along the cutting edge. A larger wedge angle will result in a larger radius of the edge rounding, forming a stronger edge, and a smaller wedge angle will result in a smaller radius of the edge rounding, forming a sharper edge.

The material may be removed by wet blasting, dry blasting, brushing, electro discharge machining or laser processing (e.g. laser ablation). Since these methods may be used to provide a constant material removal rate per length unit of the edge, the processing parameters of the methods may be maintained constant over the cutting edge, simplifying the processing.

The constant material removal rate may be within the range of 100-600 µm² per length unit of the edge per unit of time, preferably within the range of 200-500 µm² per length unit of the edge per unit of time, more preferably within the range of 300-400 µm² per length unit of the edge per unit of time. Thereby a suitable range of edge radii may be achieved.

The cutting edge may have a constant edge radius in a cross-section of the cutting edge, i.e. formed by a circular segment, or the edge radius may vary in a cross-section of the cutting edge, i.e. forming an asymmetric edge. An asymmetric edge may be defined by the length of the edge rounding W along the rake face and H along the clearance face, preferably wherein W/H>1. An example of such an asymmetric edge is disclosed in EP 0654317 A1.

The resulting radius of the edge rounding may be within the range of 10-70 µm, preferably within the range of 15-45 µm, such as 15-50 µm, more preferably within the range of 20-40 µm. Thus a range of edge radii may be obtained to optimize the cutting properties over the cutting edge.

The wedge angle may be formed on the cutting tool blank by grinding a sintered body, or formed during molding of a cutting tool green body before sintering. Thus the wedge angle having a variation along the cutting edge may be achieved in a cutting tool blank suitable for further processing.

The method may comprise a further step of applying a hard coating to the cutting tool blank after the step of removing material from the cutting edge. Thus the properties of the cutting tool having a desired variation of the edge rounding along the cutting edge may be further improved.

The disclosure further relates to a cutting tool including a cutting edge, wherein the cutting edge is defined by a cross-sectional wedge angle having a variation along the cutting edge and wherein the cutting edge has a corresponding variation of edge rounding along the cutting edge.

Thus, a desired variation of the edge rounding along the cutting edge may be achieved by simple, fast and reliable processing means as disclosed herein. The cutting tool may preferably be obtained by, or obtainable by, the method as disclosed herein.

The cutting tool may be a turning tool (including general turning, threading, boring, grooving, parting etc.) or a drilling tool, or a cutting insert for turning or drilling. During turning and drilling the tool is subjected to stable cutting with a minimum of vibrations. Therefore in these types of operations the cutting tool may advantageously utilize sharper (and thus more fragile) edges at various portions of the tool without jeopardizing the durability of the edge.

During intermittent machining operations (e.g. milling), vibrations may arise which necessitates a stronger edge all over the cutting tool.

The cutting edge may be formed by a wedge-shaped cross-section with a wedge angle having a variation along the cutting edge, i.e. corresponding to a cross-sectional shape formed by two intersecting straight lines. Alternatively the wedge angle may be formed by a cross-sectional shape of any other kind, having a variation along the cutting edge. Then the shape forms the wedge angle having a variation along the cutting edge. The cross-sectional shape may be formed by two intersecting lines which are straight, convex, concave or combinations thereof, and defining the wedge angle at the point of intersection.

The wedge angle may be within the range of 60 to 100 degrees, preferably within the range of 70 to 90 degrees, along the cutting edge. Thereby a suitable range of edge radii may be achieved.

The variation of the wedge angle along the cutting edge may be within the range of 5-35 degrees, preferably within the range of 10-30 degrees, more preferably within the range of 15-25 degrees, or within the range of 10-20 degrees, along the cutting edge. Thereby a suitable range of edge radii may be achieved.

The variation of the wedge angle may be obtained by a variation of the clearance angle along the cutting edge. Thus the rake angle of the cutting tool may be held unchanged in order to maintain a desired cutting property of the cutting tool.

The variation of the wedge angle may preferably be continuous along the cutting edge. When applied to cutting tool inserts, the variation of the clearance angle, forming the wedge angle, may be limited to a portion of the tool (e.g. 1 mm) from the cutting edge, meaning not extending all the way down to the other face of the tool, thus providing a feature to fabricate cutting tools with cutting edges on both sides (e.g. negative inserts).

The cutting tool may have a nose and a leading edge and/or a trailing edge and the wedge angle may be smaller at the nose than at the leading edge and/or the trailing edge, whereby the radius of the edge rounding is smaller at the nose than at the leading edge and/or the trailing edge. Typically, the cutting properties at the nose region of the cutting tool differ from the cutting properties at the leading edge and/or a trailing edge, whereby it may be desirable to have a sharper edge at the nose region than at the leading and/or trailing edge.

The wedge angle may be gradually expanded from the tip of the nose towards the leading edge and/or trailing edge, whereby the edge radius is gradually increasing from the tip of the nose towards the leading edge and/or trailing edge.

The cutting tool may be a sintered cemented carbide body or a cubic boron nitride body.

The disclosure further relates to the use of a cutting tool as disclosed herein to machine stainless steel or titanium alloy. Stainless steel and titanium alloys are difficult to machine and it may be important to provide a cutting edge having a sharpness that is optimized to the local cutting properties along various portions of the cutting edge, e.g to have a sharper edge at the nose region of the cutting tool.

BRIEF DESCRIPTION OF DRAWINGS

FIG. 1 shows a cutting tool in top view, indicating a section II-II of the cutting edge.

FIG. 2 shows the cutting edge of the cutting tool in section II-II.

FIG. 3 shows a perspective view of the cutting tool, indicating a section II-II of the cutting edge.

FIG. 4 shows a detail of the cutting edge of the cutting tool in section II-II, with the edge rounding.

DEFINITIONS

Figure 5:
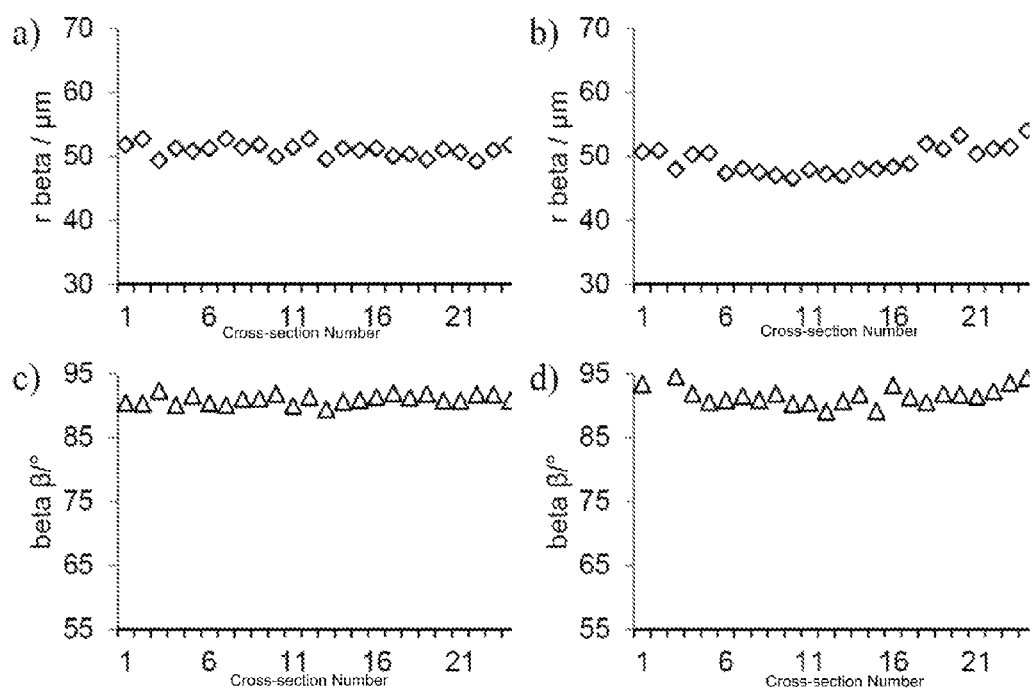
FIG. 5 shows measurements of the edge radius $r_\beta$ along the cutting edge of a reference cutting tool, and the corresponding wedge angle.
Figure 6:
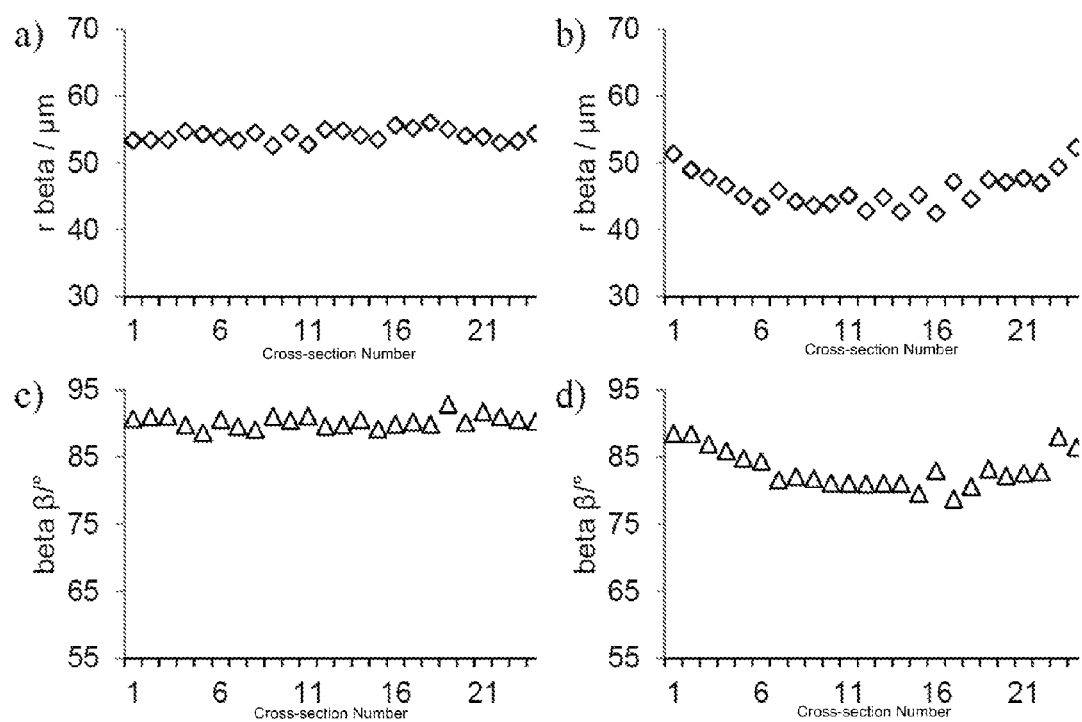
FIG. 6 shows measurements of the edge radius $r_\beta$ along the cutting edge of a cutting tool (variant A) having a variation of the wedge angle, and the corresponding wedge angle.
Figure 7:
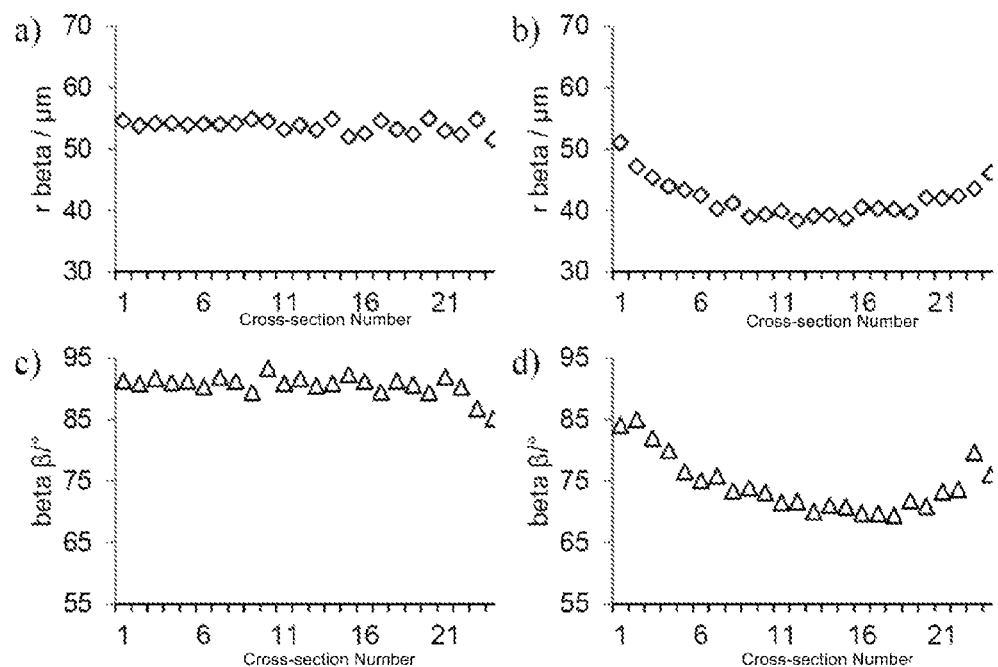
FIG. 7 shows measurements of the edge radius $r_\beta$ along the cutting edge of a cutting tool (variant B) having a variation of the wedge angle, and the corresponding wedge angle.

Wedge angle $\beta$ is defined as the angle between a rake surface and a flank surface in a cross-section of the cutting edge.

DETAILED DESCRIPTION

In FIGS. 1 and 3 a cutting tool in the form of a cutting insert 1 is shown in a top view and a perspective view respectively. The cutting insert comprises a body 2 of a hard material, e.g. cemented carbide (WC) or cubic boron nitride. The cutting insert is provided with a rake face 3, facing the material to be machined during operation. The cutting insert further comprises one or more flank (or clearance) faces 4. In the example shown the cutting insert is an indexed cutting insert, having four indexable cutting positions, and thus four similar flank faces. In the interception between the rake and flank faces, a cutting edge 5 is defined, in this case continuously encircling the cutting insert. Depending on the orientation of the cutting insert during machining operation, different portions of the cutting edge define a leading edge, a trailing edge and a nose region. The leading edge 6 is the edge meeting the material to be machined. The trailing edge 7 may or may not be in contact with the material to be machined, depending on the configuration of the cutting insert and machining parameters. Between the leading edge and the trailing edge, a nose region 8 is defined, e.g. having a nose radius.

FIG. 2 shows a section of the cutting insert in FIGS. 1 and 3, in the plane indicated by II-II, showing the rake face 3, the clearance face 4 and the cutting edge 5.

In FIG. 4, a detailed view of the cutting edge 5 in FIG. 2 is shown, with the rake face 3 and the clearance face 4. The wedge angle $\beta$ and the clearance angle $\gamma$ is shown, as well as the edge rounding having an edge radius $r_\beta$. The theoretical shape of the cutting edge before removal of material from the cutting edge, is indicated by dotted lines.

In the following, examples of cutting inserts for turning operations will be described in more detail, however similar considerations apply for e.g. drilling tools.

It is important to note that the amount of material being cut by the cutting tool per unit length of the cutting edge during machining operation differs along the cutting edge. In turning for example, the amount of material being cut at the leading edge is larger per unit length of the cutting edge at the leading edge than at the nose region. This is because the cutting insert is oriented such that the leading edge is more or less aligned with the feed direction of the material to be machined. The cutting edge at the nose region on the other hand is not aligned with the feed direction of the material to be machined. Therefore the amount of material that is being cut by the cutting insert differs between the leading edge and the nose region. At the leading edge the amount of material being cut per unit length of the cutting edge is larger than at the nose region. Therefore, a stronger edge is preferred at the leading edge. It is also desired to have a larger wedge angle at the leading edge to improve dissipation of thermal energy in the cutting insert during machining. Because the uncut chip thickness of the edge in the nose region is thinner, a sharper edge is preferred in this region.

Thus the cutting insert is provided with a continuous variation of the wedge angle along the cutting edge, such that the wedge angle is larger at the leading edge and smaller in the nose region. Therefore the cutting insert is configured such that the wedge angle is smaller at the nose than at the leading edge and/or the trailing edge. The wedge angle is gradually expanded from the tip of the nose towards the leading edge and/or trailing edge, whereby the edge radius is gradually increasing from the tip of the nose towards the leading edge and/or trailing edge. The wedge angle is formed by a wedge-shaped cross-section of the cutting edge. The variation of the wedge angle is obtained by a variation of the clearance angle (γ in FIG. 4) along the cutting edge.

The wedge angle is within the range of 60 to 100 degrees, preferably within the range of 70 to 90 degrees, along the cutting edge. The variation of the wedge angle along the cutting edge is within the range of 5-35 degrees, preferably within the range of 10-30 degrees, more preferably within the range of 15-25 degrees, or within the range of 10-20 degrees, along the cutting edge.

The variation of the wedge angle along the cutting edge is preferably formed during molding of a green body of the cutting insert, i.e. before sintering of the cutting insert. Alternatively the variation of the wedge angle along the cutting edge may be formed by grinding of the periphery, forming the cutting edge, of the cutting insert after sintering.

Material is removed from the cutting edge of the sintered cutting tool by means of e.g. wet blasting, dry blasting, brushing, electro discharge machining or laser processing. Material is removed with a constant material removal rate per length unit of the edge.

Due to the combination of the variation of the wedge angle along the cutting edge, and the removal of material along the cutting edge with a constant material removal rate per length unit of the edge, the radius of the edge rounding is smaller at the nose than at the leading edge and/or the trailing edge.

Thus a cutting insert is provided with a sharper edge at the nose region and a stronger edge at the leading edge.

EXAMPLES

Four set of cutting inserts are disclosed. The wedge angles in all four sets were created by keeping the rake face of CNMG-120408-MM inserts unchanged and modifying the clearance face by means of periphery grinding. The leading edge of the cutting insert has a wedge angle of 90° in all variants. Starting from the beginning of the nose on the leading edge, the wedge angle decreases to a minimum of 80°, 70° and 60° at the center of the nose in variants A, B and C, respectively, after which it increases back to 90° at the end of the nose edge, where the nose meets the trailing edge, in all variants. A reference insert is included in the set of cutting inserts where the wedge angle is 90° and is constant along the edge. The wedge angles (and clearance angles) of these different sets of cutting tools are shown in Table 1.

TABLE 1

Examples of four different sets of cutting inserts.

|  | Leading edge wedge angle/clearance angle | Nose edge minimum wedge angle/clearance angle |
|---|---|---|
| Reference | 90°/0° | 90°/0° |
| Variant A | 90°/0° | 80°/10° |
| Variant B | 90°/0° | 70°/20° |
| Variant C | 90°/0° | 60°/30° |

Inserts were blasted in a wet blasting machine by Alox (aluminum oxide mesh size) 220 with 2.5 bar blasting pressure in a single process. The target cutting edge radius for a 90 degrees wedge angle was 55 μm. Subsequent to the blasting process the edge radius was measured along the leading edge and on the nose edge. The wedge angle was also measured along this length of the cutting edge.

Figure 8:
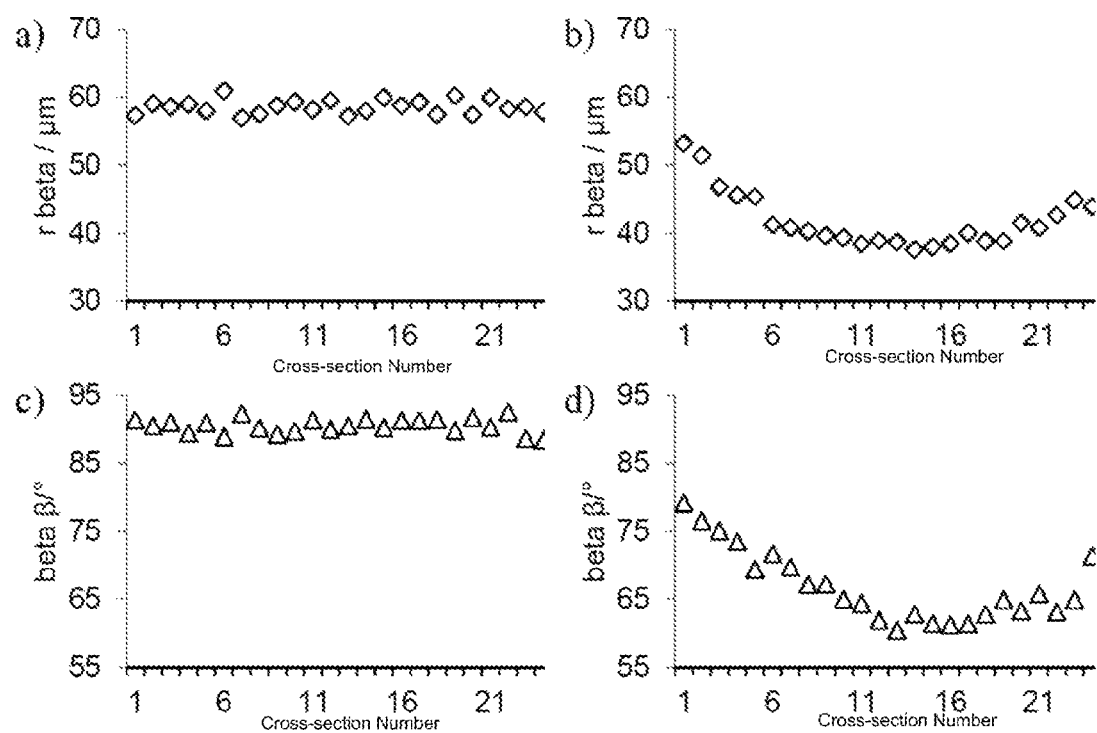
FIG. 8 shows measurements of the edge radius $r_\beta$ along the cutting edge of a cutting tool (variant C) having a variation of the wedge angle, and the corresponding wedge angle.

In FIGS. 5-8 the cutting edge radius (a and b) and the wedge angle (c and d) measured along this length of the cutting edge is shown for the reference insert (FIG. 5) and the different variants A (FIG. 6), B (FIG. 7) and C (FIG. 8). Each data point represents a cross sectional measurement on the cutting edge. The measurements are shown for the leading edge (a and c) and for the nose section of the edge (b and d). There are 24 cross sections on the leading edge and 24 on the nose section of the edge. The average distance between two measurement points is 70 μm.

As can be seen in FIGS. 5-8, there is a strong correlation between the wedge angle and edge radius at different locations along the cutting edge. As the wedge angle decreases in the nose region (see FIGS. 5-8d) the cutting edge radius also decreases (see FIGS. 5-8b) and as a result a variable edge micro-geometry will be created in all three variants. A 30% reduction in the wedge angle (from 90° to 60°), would lead to almost 35% reduction in edge radius value.

Figure 9:
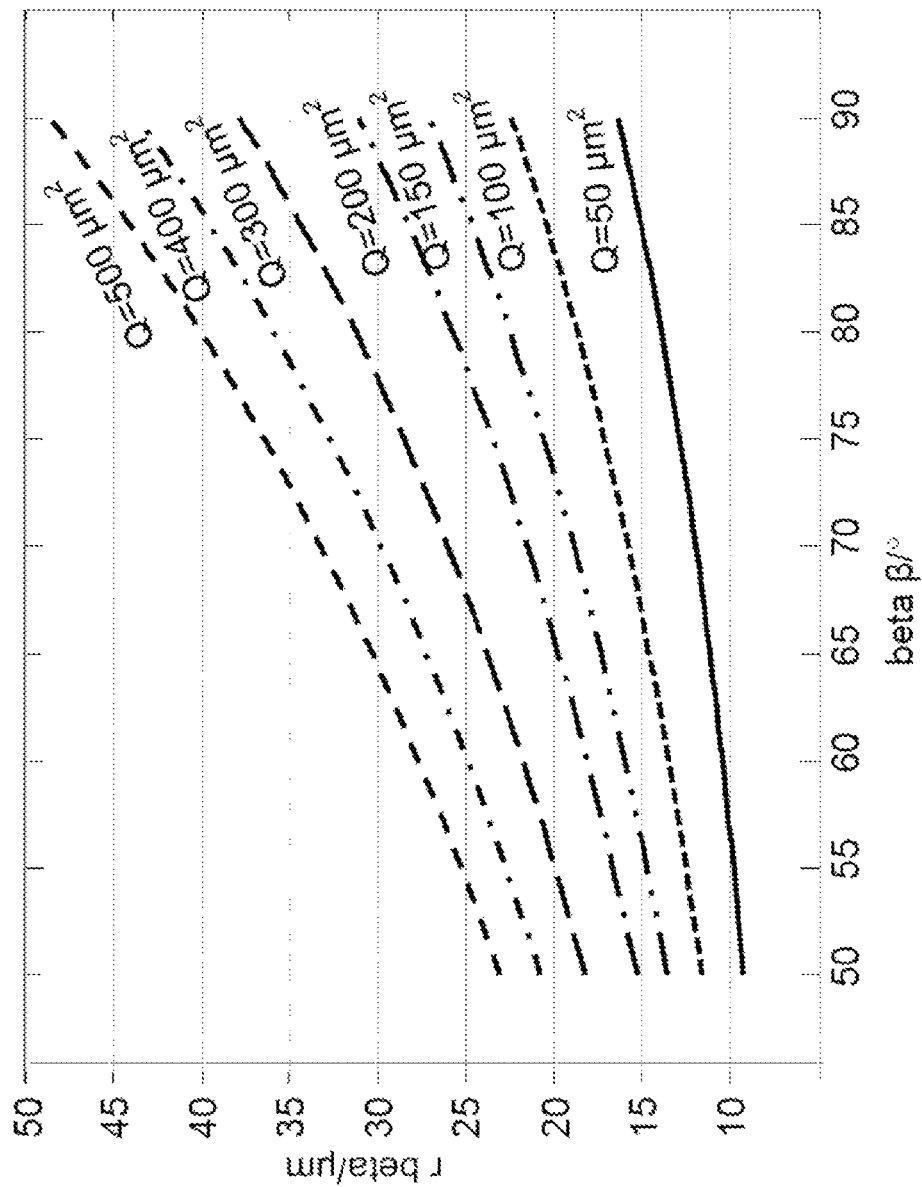
FIG. 9 shows examples of resulting edge radius $r_\beta$ depending on wedge angle $\beta$ and material removal rate Q per unit edge length per unit of time.

In FIG. 9 the effect of varying wedge angle and material removal rate per length unit of the edge is shown. The material removal rate is defined as a removal of a volume of material per length unit of the edge and per unit of time. The graph shows the resulting edge radius $r_\beta$ depending on wedge angle β for seven different material removal rates Q, from 50 μm² per unit edge length per unit of time, to 500 m² per unit edge length per unit of time. It is clear from the graph that the resulting edge radius $r_\beta$ decreases with decreasing wedge angle β. The material removal rate is preferably within the range of 100-600 μm² per length unit of the edge per unit of time, or within the range of 200-500 μm² per length unit of the edge per unit of time, or within the range of 300-400 μm² per length unit of the edge per unit of time.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A method of manufacturing a cutting tool, comprising the steps of:
   providing a cutting tool blank comprising a cutting edge, defined by a cross-sectional wedge angle, wherein the wedge angle has a variation along the cutting edge; and
   removing material from the cutting edge, with a constant material removal rate per length unit of the edge to form a corresponding variation of edge rounding along the cutting edge.

2. The method according to claim 1, wherein material is removed by wet blasting, dry blasting, brushing, electro discharge machining or laser processing.

3. The method according to claim 1, wherein the constant material removal rate is within the range of 100-600 $\mu m^2$ per length unit of the edge per unit of time.

4. The method according to claim 1, wherein the corresponding variation of edge rounding has a radius within the range of 10-70 $\mu m$.

5. The method according to claim 1, wherein the wedge angle is formed on the cutting tool blank by grinding a sintered body, or formed during molding of a cutting tool green body before sintering.

6. The method according to claim 1, further comprising the step of applying a hard coating to the cutting tool blank after the step of removing material from the cutting edge.

7. A cutting tool comprising a cutting edge, wherein the cutting edge is defined by a cross-sectional wedge angle having a variation along the cutting edge and wherein the cutting edge has a corresponding variation of edge rounding along the cutting edge, made according to the method according to claim 1.

8. The cutting tool according to claim 7, wherein the cutting tool is a turning tool or a drilling tool, or a cutting insert for turning or drilling.

9. The cutting tool according to claim 7, wherein the wedge angle is within the range of 60 to 100 degrees along the cutting edge.

10. The cutting tool according to claim 7, wherein the variation of the wedge angle along the cutting edge is within the range of 5-35 degrees along the cutting edge.

11. The cutting tool according to claim 7, wherein the variation of the wedge angle is obtained by a variation of a clearance angle along the cutting edge.

12. The cutting tool according to claim 7, wherein the variation of the wedge angle is continuous along the cutting edge.

13. The cutting tool according to claim 7, wherein the cutting tool has a nose and a leading edge and/or a trailing edge and wherein the wedge angle is smaller at the nose than at the leading edge and/or the trailing edge, whereby the edge rounding has a smaller radius at the nose than at the leading edge and/or the trailing edge.

14. The cutting tool according to claim 13, wherein the wedge angle is gradually expanded from a tip of the nose towards the leading edge and/or the trailing edge, whereby the edge rounding radius is gradually increasing from the tip of the nose towards the leading edge and/or the trailing edge.

15. The cutting tool according to claim 7, wherein the cutting tool blank is a sintered cemented carbide body or a cubic boron nitride body.

* * * * *